S. B. POTTER.
AUTOMOBILE LAMP ATTACHMENT.
APPLICATION FILED MAY 17, 1915.
1,180,528.
Patented Apr. 25, 1916.
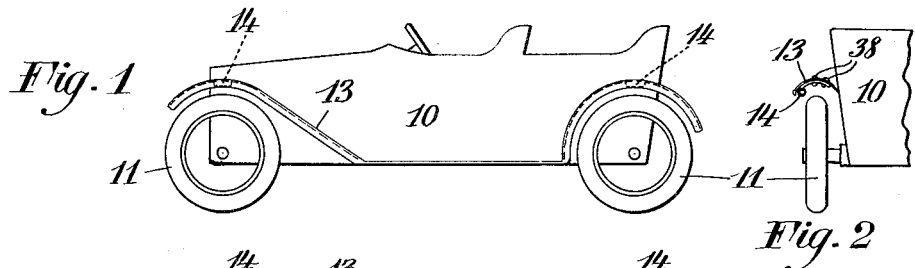
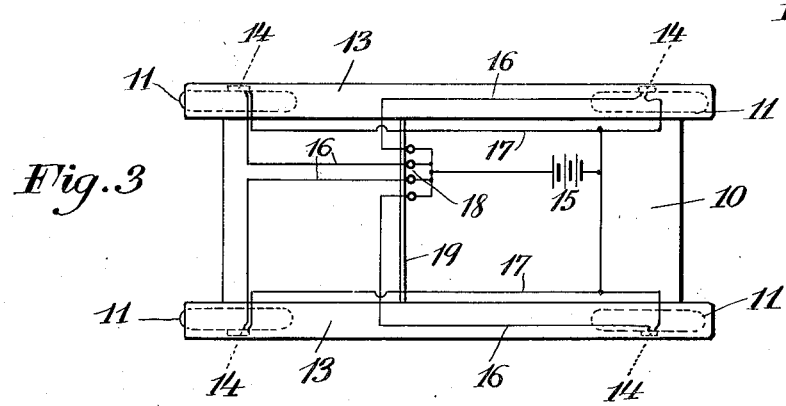
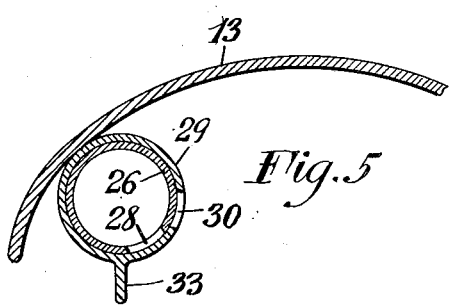
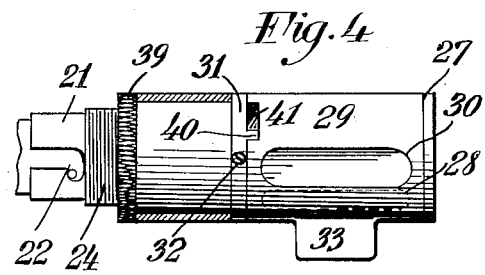
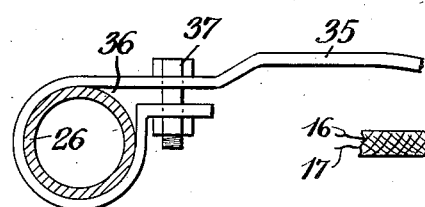
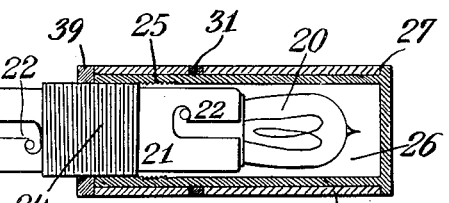
Shirley B. Potter, Inventor
By his Attorney
Thomas L. Thompson

UNITED STATES PATENT OFFICE.

SHIRLEY B. POTTER, OF ASBURY PARK, NEW JERSEY.

AUTOMOBILE-LAMP ATTACHMENT.

1,180,528.  Specification of Letters Patent.  Patented Apr. 25, 1916.

Application filed May 17, 1915. Serial No. 28,557.

*To all whom it may concern:*

Be it known that I, SHIRLEY B. POTTER, a citizen of the United States, and resident of Asbury Park, in the county of Monmouth and State of New Jersey, have invented certain new and useful Improvements in Automobile-Lamp Attachments, of which the following is a specification.

This invention relates to improvements in automobile lamp attachment and has particular reference to means or devices for illuminating the wheels of an automobile while making repairs thereto or otherwise working around or on the wheels.

The object of the invention is to provide an electric lamp for illuminating a wheel of an automobile or other vehicle, so arranged and constructed that it may be readily secured in the proper position on the mudguard or other convenient element adjacent or near the wheel.

Still other objects of the invention are to provide suitable securing means for the lamps and to arrange the wires for supplying the current in such a manner that any one or all of the lamps may be turned on and off by means of push buttons or switches.

Other objects will appear as this specification proceeds while reference is had to the accompanying drawing in which—

Figure 1 is a side elevation of an automobile in outline showing the position of the lamps near the wheels. Fig. 2 is an end view of a single wheel and its mudguard and lamp. Fig. 3 is a plan view of the automobile showing the wiring diagram for the lamps. Fig. 4 is a side view of a lamp looking outward from the vehicle. Fig. 5 is a sectional view of the lamp casing and a portion of the mudguard. Fig. 6 is a longitudinal sectional view of the lamp, and Fig. 7 is a transverse sectional view illustrating the supporting bracket.

Referring to Figs. 1, 2 and 3 the reference numeral 10 denotes the vehicle, 11, 11 the wheels and 13, 13 the mudguards. 14, 14 represent electric lamps of suitable construction, described hereinafter, mounted on the mudguards on the side toward the wheels and in a position directly above the latter, but to the outside thereof as shown in Fig. 2. The current for the lamps may be furnished from a suitable source such as a battery 15 for instance through the wires 16 and 17 and controlled by switches 18 mounted on the dash 19 if desired. Normally the lamps will all be turned off so as not to waste any current. But when work is to be done on one of the wheels, or a tire repaired or the entire wheel changed, the particular lamp is turned on so as to illuminate the entire zone or space around the wheel and the work may then be done without the bother or nuisance of using a portable trouble lamp or other illuminating devices. Even in well lighted cities this invention is advantageous because when it is necessary to work around a wheel, the vehicle is generally drawn up to the curb and the worker performs his task with his back to the street lamps thus standing in his own light. Also when driving on dark roads it may be useful to illuminate say the two rear wheels constantly to avoid danger of collision from other vehicles.

The particular construction of the lamps and the means for attaching them may be varied with the make of the vehicle. Figs. 4 to 7 illustrate one good way of carrying out the details of the invention. Referring to Fig. 6 the reference numeral 20 represents an electric lamp suitably secured in a lamp holder 21 by a bayonet joint 22. Similarly the plug 23 on the end of the wire cable 16—17 may be secured to the lamp holder by a bayonet joint 22. The lamp holder is screw threaded as at 24 and engages threads 25 in the lamp casing 26 which is provided with a shoulder 27 and a slot 28, Fig. 5. 29 is a sleeve provided with a slot 30 and is rotatably held on the lamp casing between the said shoulder 27 and a collar 31 which may be secured with a set screw as 32. 33 is a finger piece on the sleeve 29 for rotating the latter to bring the slots 28 and 30 into register as is obvious. The lamp is secured to the mudguard 13 by means of a bracket 35 which forms a socket 36 in which the lamp is clamped by a bolt 37 or other means. The body portion of the bracket is thereafter bent to suit the curvature or shape of the mudguard and secured by rivets or bolts 38, 38 as seen in Fig. 2.

It will be seen that the lamp is protected against accidental injury all the time and also against dust when the slots are in the position as shown in Fig. 5. The lamp may be focused in the casing by screwing the lamp holder in or out and a lock collar 39 serves to keep the lamp in adjusted position. When it is desired to use the lamp the particular switch is pressed to close the circuit to the lamp and thereafter the sleeve 26 is rotated by the fingerpiece 33 until the slots register, when it will be seen that by reason of the position of the slot 28 the light will shine downward and on the outside of the wheel illuminating it sufficiently for the purpose.

40 is a stop on the collar 31 which limits the movement of the sleeve 26 by abutting the upper end of the slot 41 in the latter, Fig. 4.

It will be seen that I have provided a lamp adapted to be secured to the mudguard of a vehicle and so positioned that it illuminates the outside of the wheel from above. Also that the lamp is fully protected against blows or jars and is invisible so as not to mar the appearance of the car.

Details in the construction and arrangement of the lamp as well as in its supporting means may be varied to suit different makes of cars and mudguards and I claim all such modifications and variations as come within the scope of the appended claim.

I claim:—

The combination with a vehicle having wheels and mud guards therefor, of an electric lamp mounted on the inside of said mudguards above each of the wheels, each of said lamps comprising a fixed cylindrical casing provided with a shoulder adjacent its one end and provided with a slot in its lower portion in the side toward the wheel, a fixed collar on said casing, a sleeve mounted to rotate on said casing between the said shoulder and the said collar and provided with a slot, means for operating said sleeve to bring the said two slots into register to cause the light from the lamp to illuminate the outer side of the wheel, means for supplying current to the said lamp and a bracket for securing each of the lamp casings to the said mud guards and comprising a clamping portion adapted to hold the said lamp casing and a body portion adapted to be secured to the mud guard.

Signed at Asbury Park, in the county of Monmouth and State of New Jersey, this 14th day of April, A. D. 1915.

SHIRLEY B. POTTER.